United States Patent [19]

James

[11] Patent Number: 5,238,347

[45] Date of Patent: Aug. 24, 1993

[54] IN SITU REPLACEABLE PUSHER BAR FOR A BATCH CHARGER PAN

[75] Inventor: Barry James, Apple River, Ill.

[73] Assignee: Merkle Engineers, Inc., Galena, Ill.

[21] Appl. No.: 799,550

[22] Filed: Nov. 27, 1991

[51] Int. Cl.⁵ .................... B65G 25/00; F27D 3/00; C03B 3/00

[52] U.S. Cl. .................. 414/165; 414/198; 65/335

[58] Field of Search .............. 414/156, 158, 165, 176, 414/198; 432/234; 65/335, 27

[56] References Cited

U.S. PATENT DOCUMENTS

| | | | |
|---|---|---|---|
| 3,780,889 | 12/1973 | Frazier et al. | 65/335 X |
| 3,868,031 | 2/1975 | Frazier et al. | 65/335 X |
| 4,067,462 | 1/1978 | Thompson | 414/214 |
| 4,197,109 | 4/1980 | Frazier et al. | 65/27 X |
| 4,226,564 | 10/1980 | Takahashi et al. | 65/335 X |
| 4,486,139 | 12/1984 | Hendrych | 414/215 |
| 4,983,206 | 1/1991 | Trunzo | 65/27 X |
| 5,044,488 | 9/1991 | Bolin | 198/740 |
| 5,073,183 | 12/1991 | Hammond et al. | 65/335 |
| 5,123,942 | 6/1992 | Argent et al. | 65/27 |
| 5,134,627 | 7/1992 | Crouse | 65/27 X |

FOREIGN PATENT DOCUMENTS 2114968  9/1983  United Kingdom ............ 65/335

Primary Examiner—Michael S. Huppert
Assistant Examiner—Stephen T. Gordon
Attorney, Agent, or Firm—Speckman, Pauley & Fejer

[57] ABSTRACT

An in situ replaceable pusher bar for a batch charger pan of a blanket batch charger for a glass melter comprising a removable pusher bar assembly and a latching mechanism for securing the pusher bar assembly to the batch charger pan. The pusher bar assembly is provided with a slide mechanism which enables the pusher bar assembly to slide through guide mechanisms secured to the underside of the batch charger pan. The guide mechanisms are in the form of pan support tubes, inside of which are disposed latch brackets attached to the ends of rods for latching the pusher bar assembly to the batch charger pan.

7 Claims, 3 Drawing Sheets

IN SITU REPLACEABLE PUSHER BAR FOR A BATCH CHARGER PAN

BACKGROUND OF THE INVENTION

1. Field of the Invention

This invention relates to a pusher bar for blanket batch chargers employed in feeding raw material batch into a glass melting furnace, the pusher bar being replaceable in situ, that is, without removing the batch charger from its operating position next to the glass melting furnace.

2. Description of the Prior Art

On blanket batch chargers commonly employed to feed raw material batch into a glass melting furnace, it is common practice to utilize a pusher bar or nose plate to push the raw material batch into the furnace. The pusher bar or nose plate is the portion of the charger which is exposed to the most heat and thus deteriorates most rapidly. To reduce the rate of deterioration, the pusher bar or nose plate is often water cooled. Nevertheless, during normal operation, it is necessary to replace the pusher bar from time to time.

Under current practices, the pusher bar is either constructed as an integral part of the charger plate or pan of the batch charger, or it is bolted in place. Accordingly, in order to repair or replace the pusher bar, it is necessary to remove the batch charger from its operating position near the glass melting furnace, a procedure which is quite often time consuming and significantly disruptive to production. Disruptions in production of a glass melting furnace have effects far beyond the time required to repair or replace the pusher bar, it being necessary to idle the furnace until the repairs have been completed and the batch charging operation can continue. Due to the substantial momentum involved in raising a furnace from an idling mode to a full production mode, substantial amounts of time, often hours, are required to bring the furnace back to a full production level of operation.

SUMMARY OF THE INVENTION

Accordingly, it is an object of this invention to reduce the time of disruption in production resulting from repair or replacement of a pusher bar of a blanket batch charger.

It is another object of this invention to permit repair or replacement of a pusher bar of a blanket batch charger in situ, that is, without removing the charger from its operational position during the repair or replacement.

These and other objects are achieved in accordance with this invention in which a pusher bar assembly is removably attached to the batch charger pan of a blanket batch charger, the pusher bar assembly having slide means for sliding the pusher bar assembly through guides which are a part of the fixed structure of the batch charger pan thereby enabling the pusher bar assembly to be readily inserted and withdrawn from its operational position. Latching means for latching or securing the pusher bar assembly to the batch charger pan are provided beneath the batch charger pan and away from the heat generated by the glass melting furnace such that they can be actuated from a reasonably cool area.

In accordance with one embodiment of this invention, the pusher bar assembly is water cooled having a pusher bar formed of tubes with appropriate fittings for circulating cooling water therethrough. In accordance with another embodiment of this invention in which no water cooling is provided, the pusher bar is a mild steel bar.

These and other objects and features of this invention will be more readily understood and appreciated from the descriptions and drawings contained herein.

DESCRIPTION OF PREFERRED EMBODIMENTS

Figure 1:
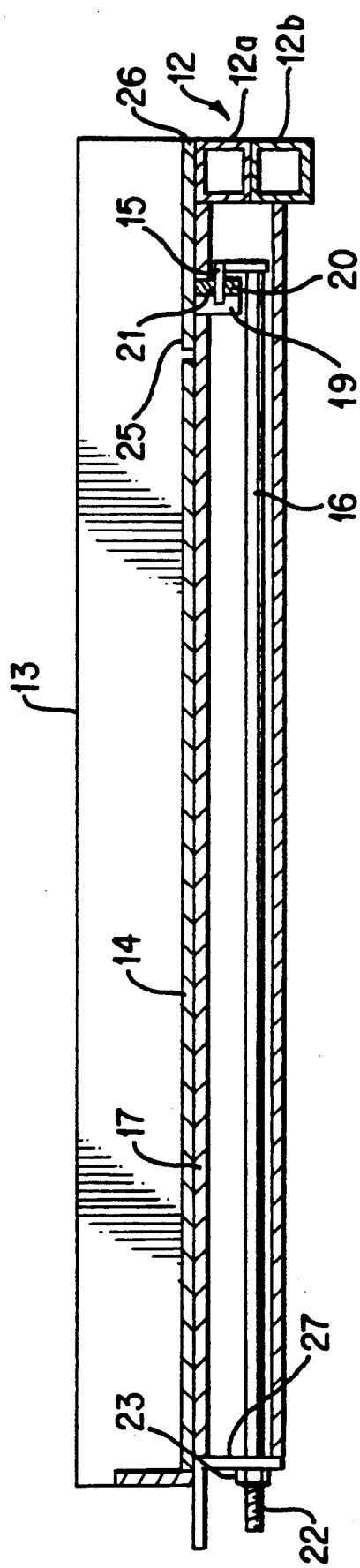
FIG. 1 is a cross-sectional diagram of a batch charger pan and pusher bar assembly in accordance with one embodiment of this invention.

A cross-sectional side view of a batch charger pan and pusher bar assembly in accordance with one embodiment of this invention is shown in FIG. 1. The pusher bar assembly comprises pusher member 12 secured to the underside of pan bottom plate 25 longitudinally along edge 26 of pan bottom plate 25, edge 26 facing the glass melter (not shown) into which batch material is to be charged. In accordance with one embodiment of this invention, pusher member 12 is water cooled and comprises tubular members 12a, 12b through which a cooling fluid, preferably water, is circulated. In accordance with another embodiment of this invention, pusher member 12 is not water cooled and comprises a mild steel bar. Pusher member 12 extends downward from pan bottom plate 25 to completely cover the ends of pan support tubes 17 secured to the underside of pan bottom 14.

Attached to the underside of pan bottom plate 25 are slide means for sliding the pusher bar assembly through guide means for guiding the pusher bar assembly secured to the bottom of pan bottom 14. In accordance with a preferred embodiment of this invention, the slide means comprise pan plate bar 20 attached to the underside of pan bottom plate 25 parallel to and spaced apart from pusher member 12. Pan plate bar 20 is provided with pan plate bar slot 21 for receiving latch member 15 disposed in the space between pan plate bar 20 and pusher member 12. Thus, the space between pan plate bar 20 and pusher member 12 must be sufficient to enable location of latch member 15 therein.

Figure 2:
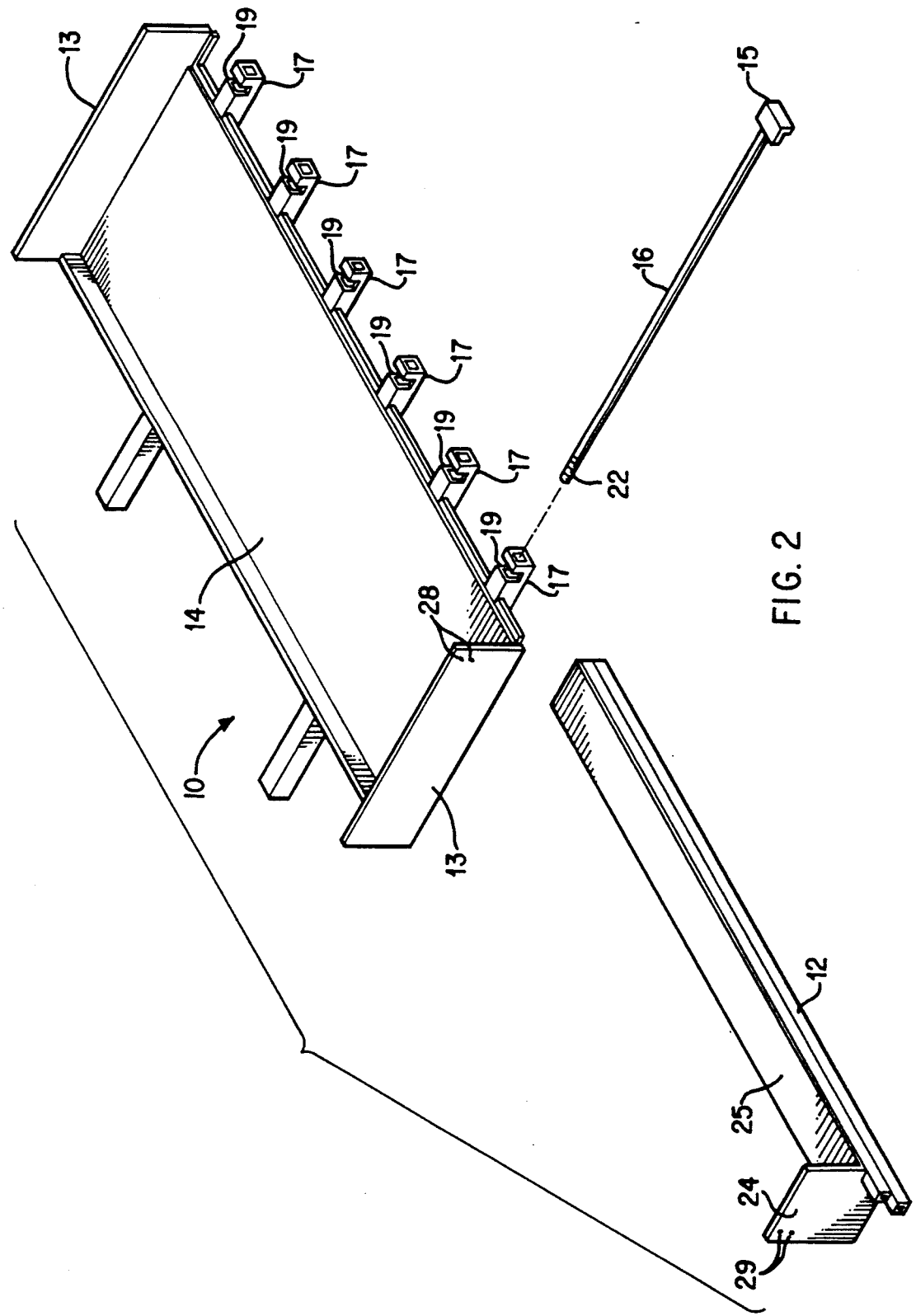
FIG. 2 is an exploded view of a batch charger pan and pusher bar assembly in accordance with one embodiment of this invention.

Secured to the underside of pan bottom 14 are guide means for guiding pan plate bar 20 secured to the underside of pan bottom plate 25. In accordance with a preferred embodiment of this invention, the guide means comprise a plurality of pan support tubes 17, as shown in FIG. 2, attached to the underside of pan bottom 14 perpendicular to pusher member 12 and extending beneath pan bottom plate 25 when the pusher bar assembly is secured to batch charger pan 10. Each pan support tube 17 is provided with pan support tube slot 19 for receiving pan plate bar 20.

Figure 3:
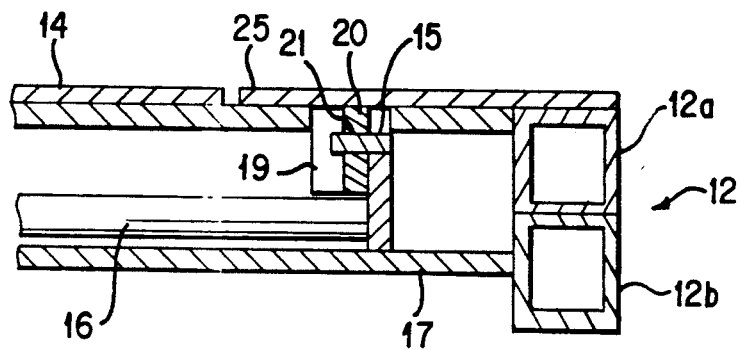
FIG. 3 is a cross-sectional view of a portion of the batch charger pan and pusher bar assembly in accordance with one embodiment of this invention showing the latching mechanism for the pusher bar assembly in the latched position.

Disposed inside pan support tube 17 are latching means for latching the pusher bar assembly to batch charger pan 10. The latching means in accordance with one embodiment of this invention comprises latch member 15 attached to one end of rod 16, the other end of which extends through end plate 27 at the end of pan support tube facing 17 away from the pusher bar assembly and is provided with fastening means for securing latch member 15 in a latched position. In accordance with one embodiment of this invention, the fastening means comprises the end of rod 16 being provided with threads 22 for receiving washer and nut set 23. Pan plate bar 20 is provided with pan plate bar slot 21 into which latch member 15 is inserted when the pusher bar assembly is latched to batch charger pan 10. FIG. 3 is an enlarged cross-sectional side view showing latch member 15 inserted into pan plate bar slot 21 of pan plate bar 20, and further showing pan plate bar 20 positioned in pan support tube slot 19.

Figure 4:
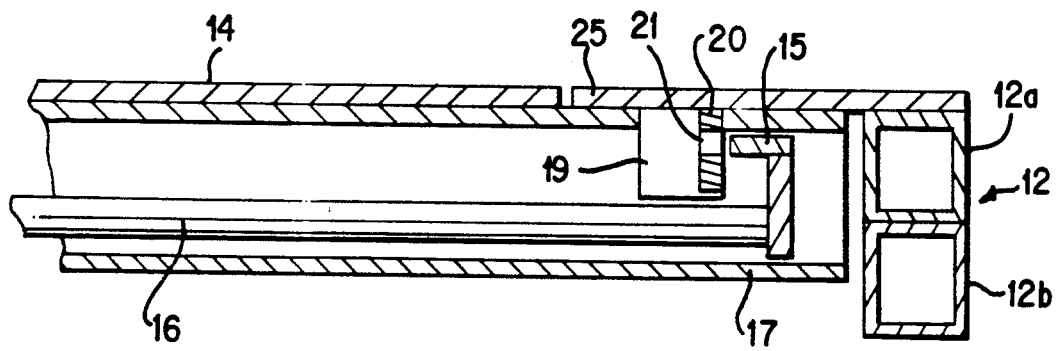
FIG. 4 is a cross-sectional view of the batch charger pan and pusher bar assembly showing the latching mechanism in the unlatched position.

FIG. 4 shows an enlarged cross-sectional side view of the pusher bar assembly and latch means in the unlatched position in which latch member 15 is withdrawn from pan plate bar slot 21, thereby permitting the pusher bar assembly comprising pusher member 12, pan bottom plate 25, and pan plate bar 20 to slide along pan support tube slot 19 and be removed from batch charger pan 10.

Latching and unlatching of latch member 15 is effected by washer and nut set 23 on the end of rod 16 having threads 22, said threaded end 22 of rod 16 extending through end plate 27 at the end of pan support tube 17 facing away from the pusher bar assembly. Thus, as washer and nut set 23 is threaded onto threaded end 22 of rod 16, latch member 15 is pulled toward pan plate bar 20 and engages pan plate bar slot 21. To unlatch latch member 15, washer and nut set 23 is backed off of threaded end 22 of rod 16, thereby enabling latch member 15 to disengage from pan plate bar slot 21.

As shown in FIG. 2, at one end of pan bottom plate 25 is attached pan fence plate 24. Thus, when the pusher bar assembly is slid through pan support tube slots 19, pan fence plate 24 is flush with pan fence 13. Pan fence 13 and pan fence plate 24 may be secured to one another by bolts through bolt holes 28, 29. In addition, when the pusher bar assembly is secured to batch charger pan 10 in an operational position, pan bottom plate 25 is flush with pan bottom 14, forming an extension of pan bottom 14.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A blanket batch charger for a glass melter comprising:
    a batch charger pan comprising a pan bottom and two pan fences attached to opposite ends of said pan bottom;
    a pusher bar assembly removably attached to said batch charger pan and facing said glass melter, said pusher bar assembly comprising a pan bottom plate, at least one solid bar or tubular shaped pusher member secured longitudinally to the underside of said pan bottom plate along an edge of said pan bottom plate facing said glass melter, said pan bottom plate having a length equivalent to the length of said pan bottom between said pan fences, and a pan fence plate connected to an end of said pusher member, said pan fence plate aligned with one of said pan fences forming a pan fence assembly of said batch charger pan;
    latching means for latching said pusher bar assembly to said batch charger pan; and
    slide means for sliding said pusher bar assembly through guide means for guiding said pusher bar assembly fixedly secured to said batch charger pan, said slide means comprising a pan plate bar attached to an underside of said pan bottom plate parallel to and spaced apart from said pusher member and having at least one pan plate bar slot for receiving said latching means.

2. A blanket batch charger in accordance with claim 1, wherein said guide means comprises a plurality of pan support tubes attached to said underside of said pan bottom perpendicular to said pusher member and extending beneath said pan bottom plate, each said pan support tube having a slot for receiving said slide means.

3. A blanket batch charger in accordance with claim 2, wherein said latching means are disposed within said pan support tubes.

4. A blanket batch charger in accordance with claim 1, wherein said latching means further comprises a latch member adapted to engage said pan plate bar slot and a rod, one end of which is attached to said latch member.

5. A blanket batch charger in accordance with claim 4, wherein the other end of said rod is provided with fastening means for securing said latch member in a latched position and extends beyond an end of said pan support tube facing away from said pusher bar assembly.

6. A blanket batch charger in accordance with claim 4, wherein said latch member is disposed between said pan plate bar and said pusher member.

7. A blanket batch charger in accordance with claim 5, wherein said fastening means comprises a washer and nut set secured to a threaded end of said rod extending through an opening in an end plate secured to said end of said pan support tube facing away from said pusher bar assembly whereby said latch member is maintained in said pan plate bar slot in said pan plate bar when said pusher bar assembly is in an operational position.

* * * * *